Aug. 20, 1968  R. I. GENIN ET AL  3,397,467
AUDIO-VISUAL AUTODIDACTIC DEVICE
Filed Dec. 14, 1966  3 Sheets-Sheet 1
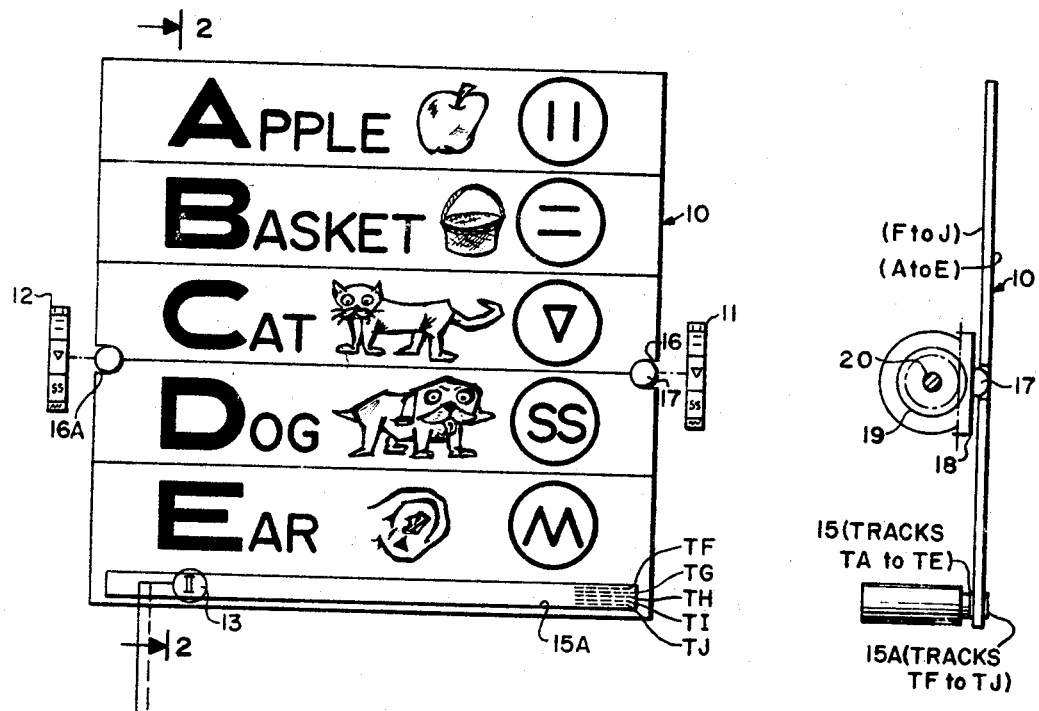
FIG. 1
FIG. 2
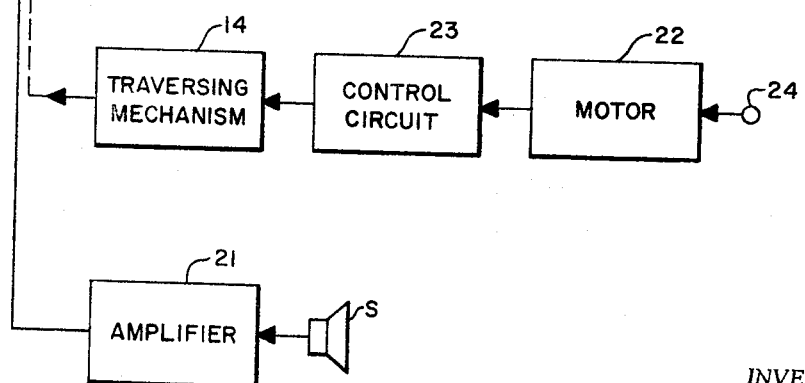
INVENTORS
ROBERT I. GENIN
JOSEPH WAPNER
BY Michael Ebert
ATTORNEY Aug. 20, 1968  R. I. GENIN ET AL  3,397,467
AUDIO-VISUAL AUTODIDACTIC DEVICE
Filed Dec. 14, 1966  3 Sheets-Sheet 2

INVENTORS
ROBERT I. GENIN
JOSEPH WAPNER
BY
ATTORNEY

TAPE DIRECTION

INVENTORS
ROBERT I. GENIN
JOSEPH WAPNER
BY

ATTORNEY

3,397,467
AUDIO-VISUAL AUTODIDACTIC DEVICE
Robert I. Genin, Scarsdale, N.Y., and Joseph Wapner, Levittown, Pa., assignors, by mesne assignments, to Amram et Fils S.A.R.L., a corporation of France
Filed Dec. 14, 1966, Ser. No. 601,645
9 Claims. (Cl. 35—35)

This invention relates generally to audio-visual teaching tools, and more particularly to an autodidactic device whereby a student presented with several printed words, pictures or other items of visual information may then elect to hear any one of these words, or to hear verbal instructions respecting a selected item.

The crucial problem besetting the field of child education is the reading process, for unless a child is able to read, he is foreclosed from knowledge which can be acquired only from books. Learning to read, therefore, is the prelude to education, and without this facility the child is unable to make progress in school. Even children of low intelligence can speak and understand the spoken word. But the English language is not spelled phonetically, and while a beginner may have mastered the alphabet, he finds it difficult to read a word formed arbitrarily of a group of letters. To be meaningful, the overall visual impression made by the letters of a word must be translated into the familiar sound for that word.

For example, a simple word such as "KNOW" is impossible to pronounce if treated phonetically. Even when enunciated properly, the sound, by itself, does not tell the child that what is meant by "KNOW" is not the negative sense of this sound, but the sense of understanding. Hence, the young reader must, by rote, be made to relate the printed word "KNOW" not only with its sound, which is phonetically unrelated to its spelling, but to its specific sense as well. This reading ability can only be attained by dint of repetition until such time as the child is intellectually conditioned to immediately associate the printed symbols for a word with both its sound and meaning.

A child may have an average or even superior intelligence and yet encounter great difficulty in learning to read and spell. This is a universal problem in which many factors are involved. Thus the atmosphere of the classroom may be intimidating to the young child, he may be fearful of teachers, or be bored and unresponsive away from home. In some instances, resistance to reading assumes the proportions of a psychological block.

It is now recognized in educational circles that a child who in a formal classroom environment appears to have a low learning capacity, is capable of learning more quickly when the knowledge to be acquired is intermingled with or incidental to play activity or some simple mechanical actions under his direct control. Thus a child may find arithmetic difficult when dealing with numbers abstractly, yet he may acquire a ready facility with numbers when they are involved in a competitive game calling for physical manipulations tied in with simple arithmetic calculations.

Accordingly, it is the main object of this invention to provide a self-operated autodidactic device adapted to present a student with several items of visual information, such as printed words, symbols or pictures, and to verbalize any word selected by the student or to give a brief verbal explanation of any item selected by the student.

In effect, therefore, the device acts as a personal instructor who talks and explains under the command of the student, but who limits his verbal instructions to one bit of selected information at a time. Because the device is operated by the student, it may be used at home away from distracting or unnerving influences, and because there are playful aspects to the use of the device, particularly since it is the teacher who now obeys the student, an ability to read may be acquired readily by children who have difficulty in learning.

More specifically, it is an object of the invention to provide a self-teaching device wherein a series of items of visual information, such as printed words, appears on a card having a like series of magnetically recorded sound tracks thereon, the card being placeable on a playback assembly provided with a dial operated by the student to select any item on the card, the operation of the dial serving to align a playback head with the track associated with the selected item, such that when the student presses a switch, the selected sound track is then played back to give the student the sound of the selected word or other information respecting the selected item.

A significant feature of the invention lies in its exceptional simplicity and ease of operation, for each card may be of conventional size and have no more than, say, five bits of reading information printed thereon, the related five sound tracks all being recorded on a single strip of tape secured to the edge of the card. There is no limit to the library of such cards which may be formed, and a beginning student may first be supplied with a set of cards intended to teach him simple words which he can listen to until such time as he has mastered these words, and thereafter supplied with a set of more difficult words.

While the autodidactic device lends itself to private use at home, remedial reading classes may be provided with such devices for the use of students to relieve teachers of the necessity for repetitive drill. The device is also useful for programmed instruction in which the subject-matter is broken down into elemental bits to render it more digestible. Recent pedagogical developments have placed emphasis on pre-school training. To this end, the device is adapted to teach children in the three to five-year old age bracket, the alphabet and other elementary information, for the device is so easy to operate that the assistance of the mother is not required.

Also an object of the invention is to provide a device of the above-described type, wherein the card includes an additional or practice sound track which is not prerecorded, but which may be recorded and played back by the student in order that he may compare a pre-recorded pronunciation of a word or any other sound, with his own version.

Still another object of the invention is to provide an autodidactic device which is of efficient, sturdy and compact design, which is reliable in operation, and which may be manufactured and sold at relatively low cost.

Briefly stated, these objects are accomplished in a device constituted by a playback assembly provided with a deck adapted to accommodate a card having a series of visual information bits printed thereon, as well as a narrow strip of magnetic tape containing a like series of pre-recorded parallel tracks having verbal information thereon, each record being related to one of the visual bits. A magnetic playback head is disposed on a trackway below the deck, a dial-operated advancing mechanism being provided to shift the position of the card on the deck in order to align with the head, that track of the tape which corresponds to the visual bit selected by the dial. Also included within the assembly, is a motor which when actuated, causes the head to traverse the selected track to play back the verbal information thereon. Alternatively, the head may be moved across the track by a simple manual operation, as long as the movement is fairly uniform and at a speed appropriate to the recording.

For a better understanding of the invention, as well as other objects and further features thereof, reference is made to the following detailed description to be read in conjunction with the accompanying drawings, wherein:

FIG. 1 is a plan view of a sample instruction card in accordance with the invention, the associated playback assembly being shown schematically;

FIG. 2 is a longitudinal section taken through the card and also showing the components of the card-advancing mechanism;

Figure 3:
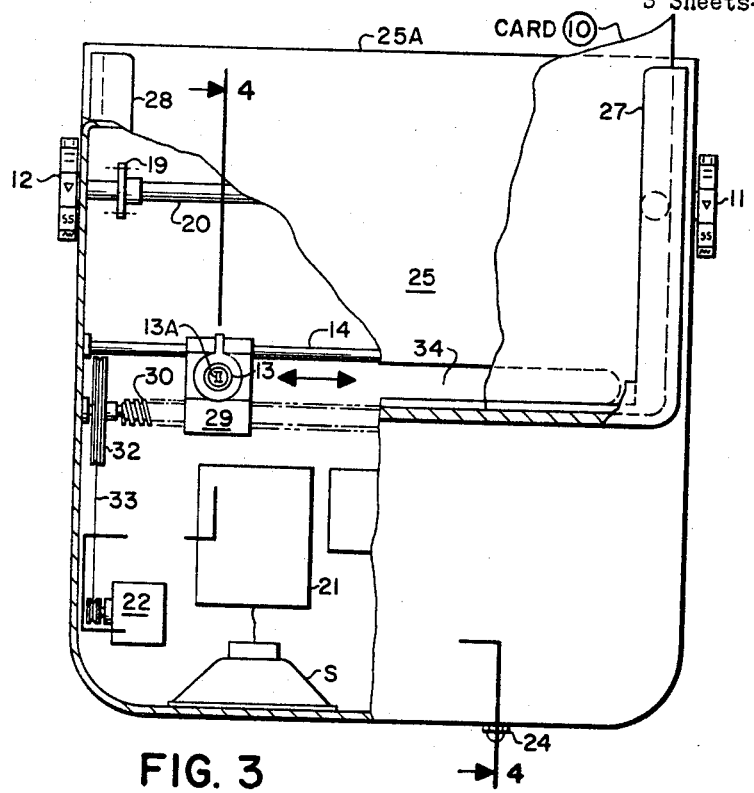
FIG. 3 is a plan view of the actual structure of the playback assembly showing the sample card on the deck thereof, the deck being partly cut away to expose the underlying elements of the assembly.

Referring now to the drawing, and more particularly to FIGS. 1 and 2, there is shown a sample card 10 in accordance with the invention. The card in practice may be 8 x 10 inches, or any other easily-handled size, the card having a series of information bits printed thereon on either side. By "bit" is meant any single item of visual data, such as a word, a symbol, a picture, or even a question or statement. The card lends itself to modern programmed teaching techniques in which the material to be taught is broken down into elementary units or bits to simplify and facilitate the learning process.

In the sample shown by way of illustration, the card is divided into five sections, the first containing the letter A, as the first letter in the word "apple," followed by an illustration of an apple. Thus the reader has before him what is, in effect, a visual translation of the word. In the second section, there is the letter B as the first letter in the word "basket," followed by an illustration of a basket. Similarly, in the third, fourth and fifth sections, the letters C, D, and E appear in conjunction with appropriate words and illustrations.

At the margin of each section is a distinct, easily recognized symbol. The purpose of these symbols is to identify the associated section on the card with respect to corresponding symbols appearing circumferentially along the surface of a pair of manually-operated dials 11 and 12. Of course, the symbols may be simple numbers or letters rather than geometric forms. These dials, which are ganged together, are disposed on either side of the card and they extend from a playback assembly, to be later described, having a top deck or platform on which the card is placed. When turned, the dials act to shift the card on the deck relative to an underlying magnetic playback head 13.

Head 13 is adapted to move under the control of a traversing mechanism 14 across the card and thereby to magnetically scan a selected one of a series of pre-recorded tracks TA, TB, TC, TD, TE, disposed in parallel relation on a strip of recording tape 15 secured to the reverse face of the card.

As noted previously, the card is printed on both faces, and in the sample shown, the sections containing the letters A, B, C, D and E, appear on the front face. The five tracks on tape 15 related to these letters are secured to the card adjacent the lower edge thereof at the rear face of the card. Assuming that the letters F, G, H, I, and J, are printed on the rear face of the card, then a magnetic tape 15A with five tracks TF, TG, TH, TI and TJ related to these letters will be attached to the front face of the card. Obviously, the invention is not limited to five sections and in practice any number may be used.

In order to register the card with the advancing mechanism therefor, the card is provided at its long side with a pair of notches 16 and 16A to accommodate spring-biased detents, one of which, 17, is shown in FIG. 2.

The detents are borne on a rack 18, disposed within the playback assembly which engages a pinion 19, rotated by a shaft 20 to which dials 11 and 12 are keyed.

Thus as the dials are turned either clockwise or counter-clockwise, the card is shifted longitudinally in one direction or another with respect to playback head 13. The arrangement is such that when the dial is turned to align a particular symbol with a fixed pointer, the card is then shifted to align that pre-recorded track with the air gap of the head which corresponds to the section on the card associated with the symbol for the selected section. It is to be understood that the rack and pinion arrangement shown is but one of many known ways by which the card may be shifted.

To avoid the need for close tolerances in the construction of the assembly and of the cards, the tape is recorded so as to produce relatively broad tracks, all of the tracks being in parallel relation, whereas the gap of the head is relatively narrow, so that even if the head is not perfectly aligned with a selected track, it will lie within the recorded region.

Playback head 13 is coupled to a suitable electronic amplifier 21, which may be a battery-operated and compact multi-stage transistor amplifier whose output is fed to a speaker S. The traversing mechanism 14 for the head 13 is operated by a battery-energized motor 22 under the control of a control circuit 23, which action is initiated by a manual switch 24. The arrangement is such that when switch 24 is depressed and held in this position, the motor is energized to drive head 13 from one end of the tape along the selected track to the other end, the motor then automatically shutting off, even though the switch is still depressed. When switch 24 is released, the motor reverses and causes the head to return to its initial position at said one end of the tape, the motor then automatically being cut off.

The traversing mechanism may in practice be manually operated in a simplified embodiment of the invention. To this end a hand-operated crank arrangement may be provided with a coupling device to cause the head to return to its starting position after the head has made a full scan. Or the crank may be used to wind up a spring motor whose function is made comparable to the electric motor shown. An even simpler form is to place the head in a wand which the child is able to move along a guide line in registration with a recorded track. If the wand in moved at a reasonably even speed which the child can learn to do with a little experience, the resultant playback will be perfectly understandable.

OPERATION

To operate the device, a student takes a teaching card of his choice and lays it down on the deck of the playback assembly, with the notches of the card in registration with the detents on the card advance mechanism. Since these detents occupy a position determined by the existing dial setting, the resultant card position will then be such as to line up the tape on the card with head 13 for playback on the track corresponding to the existing dial-setting.

The student views the card and then decides that he wishes to hear, for instance, what the word "Dog" sounds like. He turns the dial 11 or 12, whichever is convenient, to the symbol relating to "Dog" and then presses switch 24. In doing so, head 13 proceeds to scan across the selected track and he hears the word "Dog," which may be repeated several times.

In a practical embodiment, using a magnetic tape seven inches long on a card having a width of eight inches, and running the head at the rate of one inch per second, a seven-second period is available for recording. Thus it is not only possible to record a single word, but to record brief statements. This is useful where the cards are used for more elaborate teaching techniques to provide explanations or to give answers to questions appearing on the card sections. It will be appreciated that the device is also useful for teaching foreign languages, the sections on the cards containing single words or phrases which on playback may be pronounced and possibly translated.

The student keeps the switch depressed until the playback is complete, and he then releases the switch to permit the head to retrace and to return to its start position in readiness for the next operation.

STRUCTURE OF PLAYBACK ASSEMBLY

Figure 4:
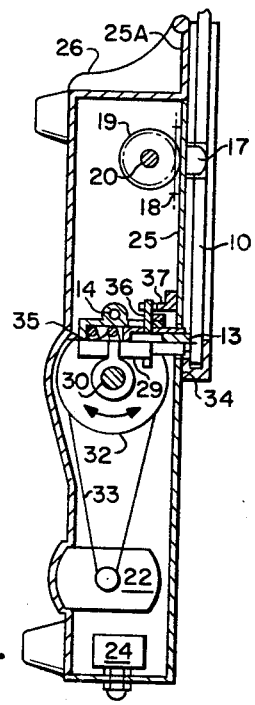
FIG. 4 is a transverse section taken through the playback assembly.

Referring now to FIGS. 3 and 4, the playback assembly is illustrated, the assembly being housed in a generally rectangular casing having a top deck 25 which extends beyond the casing to form a feed-in table 25A supported by a bracket 26. Mounted on either side of deck 25 are guide strips 27 and 28. Thus the student slides the card along table 25A into place on deck 25.

When the card 10 is fully inserted, the notches therein register with detents, as noted in connection with FIGS. 1 and 2, which are supported on a rack engaged by pinions 19. As shown in FIG. 3, the dials 11 and 12 are secured to the end of a common shaft 20, one pinion 19 being shown. Thus rotation of the dials acts to position the magnetic tape on the card with respect to the playback head 13 having an air gap 13A. Head 13 is supported on a carriage 29 which is operatively coupled to a lead screw 30, the movement of the carriage being stabilized by a rod 31 supported across the casing.

Lead scren 30 is connected to a pulley 32 which is linked by a continuous belt 33 to the shaft of motor 22. Thus when motor 22 turns in one direction, carriage 29 and head 13 thereon moves from left to right, and when the motor is reversed, the carriage moves from right to left. Carriage 29 engages limit switches at either end of its travel, these being described in the next section.

Deck 25 is provided with an elongated slot 34, aligned with the scanning path of the playback head 13 to permit the head to engage the surface of the tape. In order to permit endwise insertion of the card on the deck, it is necessary to retract the head, which would otherwise obstruct such insertion. To this end, the head is retractably supported on the carriage against the action of a spring 35.

A pin 36 is attached laterally to the head, the pin engaging a cam surface 37 below the deck, which when the head retraces and returns to its starting position, causes the head to retract. When the head leaves the starting position, the cam surface is contoured to permit spring 36 to urge the head into engagement with the tape.

Disposed within the casing of the assembly is a compact amplifier 21 whose input is coupled to the head 13 and whose output is fed to speaker S mounted at the side of the casing, sound openings or louvres being provided in the casing.

CIRCUIT OF PLAYBACK ASSEMBLY

Figure 5:
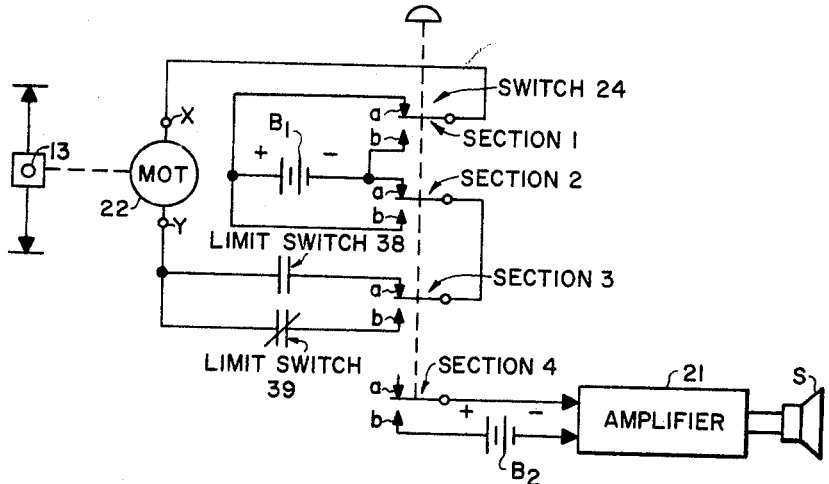
FIG. 5 is a schematic diagram showing the circuit arrangement of the playback assembly.

As shown in FIG. 5, the operating circuit for the playback assembly includes two batteries, battery $B_1$ serving to energize D-C motor 22, and battery $B_2$ to energize amplifier 21. The switch 24 is a double-pole, double-throw, multi-section switch having four ganged sections 1, 2, 3 and 4, each having a movable contact which normally engages a fixed contact $a$ and which, when depressed, is caused to engage a fixed contact $b$.

The movable contact of section 1 is connected to terminal X of motor 22, terminal X being connected through a normally-open limit switch 38 to fixed contact $a$ of section 3, whose movable contact is connected to the movable contact of section 2. Fixed contact $b$ of section 3 is connected through a normally-closed limit switch 30 to terminal Y of motor 22.

Battery $B_1$ is connected in one polarity to fixed contacts $a$ of sections 1 and 2, respectively, and in the reverse polarity to fixed contacts $b$ of the same switches. The direction of motor movement depends on the polarity of the applied voltage. As will be later evident, when switch 24 is depressed, voltage is applied in one polarity to the motor, and when released, in the reverse polarity.

Normally-open limit switch 38 is disposed at the starting position of the carriage for playback head 13 and closes when the carriage shifts to scan a selected track section, at the end of which travel the carriage encounters normally-closed limit switch 39 which is then caused to open.

In the condition shown in FIG. 5, the movable contacts in all sections of switch 24 are on the fixed contacts $a$. When switch 24 is depressed, battery $B_1$ is connected at its negative side through contact $b$ of section 1 to terminal X of the motor, the positive side of the battery going through contacts $b$ of sections 2 and 3, and the closed limit-switch 39, to terminal Y of the motor, thus causing the motor to turn in a direction advancing the carriage from the start of scanning to the finish thereof as to the selected track. At the finish, the carriage causes limit-switch 39 to open, thus breaking the circuit automatically.

When switch 24 is released, the movable contacts thereof return to contacts $a$, and in this condition, the positive side of battery $B_1$ now goes to terminal X of the motor, while the negative side goes to terminal Y of the motor through contacts $a$ of sections 2 and 3, and through the now closed limit-switch 38. Thus the direction of motor operation is reversed, the carriage retraces, and when it comes back to the starting point, it causes limit-switch 38 to reopen, thus breaking the motor circuit, and restoring the initial condition.

In the circuit shown in FIG. 5, battery $B_2$ connected to the amplifier in the normal position of switch section 4, is disconnected, but when switch 24 is depressed the battery circuit is completed through contact $b$ of switch section 4, thus rendering the amplifier operative when the head scans.

RECORDING FEATURE

As pointed out previously, for practice purposes an additional sound track may be placed on tapes 15 and 15A, which track, however, is not pre-recorded. Thus in the five-track embodiment shown, a sixth track position would be provided, and dials 11 and 12 would have a record position to permit the student to record and then play back.

Figure 6:
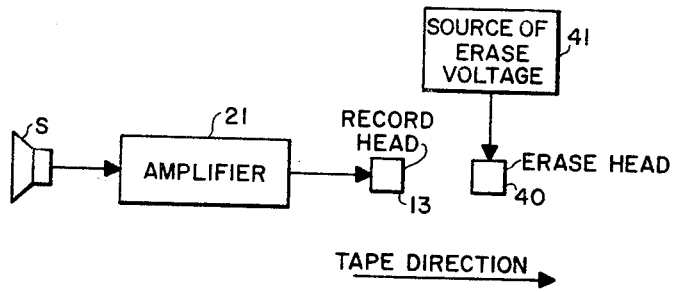
FIG. 6 is a block diagram showing the elements of the assembly when connected to record the voice of the student on a practice track.

The purpose of this feature is to make it possible for a student to record his own version of a word or phrase, or any other intelligence, for comparison with pre-recorded material on any of the other tracks. To this end, the same basic electronic components are used, except that an erase head 40 is added to the carriage, as shown in FIG. 6, and a source 41 of erase voltage is provided in accordance with well known magnetic recording techniques.

A switch is arranged to operate when the dials are in their "record" position to switch speaker S from the output to the input of the amplifier 21, and to switch head 13 to the output of the amplifier. Thus the speaker now acts as an electrodynamic microphone into which the student may speak, and the playback head now functions as a recording head. The erase head erases the track prior to recording to permit re-use thereof. After recording, the track may be played back, using the playback arrangement discussed previously.

Thus in the arrangement disclosed herein, the card is shifted relative to the playback head to align a selected track with the head. Alternatively, the card may be maintained in a fixed position, and the head shifted into proper registration. For this purpose the dials 11 and 12 may be operatively coupled to a head to shift its position to a track corresponding to the selected symbol.

While there has been shown and described a preferred embodiment of the invention, it will be appreciated that many changes and modifications may be made therein without, however, departing from the essential spirit of the invention as defined in the annexed claims.

What we claim is:
1. An audio-visual autodidactic system comprising:
(A) a card having a series of visual items printed on one face thereof, and a strip of magnetic tape secured to the opposing face thereof, said tape having a like series of pre-recorded tracks each related to a respective item, and
(B) a playback assembly including:
  (a) a deck for supporting said card,
  (b) a playback head movable under said deck across said tape,
  (c) manually-operated means engaging said card to advance same with respect to said head to bring said head into operative relation with a selected track on said tape, and
  (d) electronic means coupled to said head to reproduce the play-back track.

2. A system, as set forth in claim 1, including a traversing mechanism coupled to said head to move same from a start position to a finish position along a path corresponding to a selected track, and to cause said head to retrace.

3. A system, as set forth in claim 2, further including an electric motor to drive said tranversing mechanism, and a control circuit for said motor, including limit switches at said start and finish positions to cause said motor to reverse direction when the head reaches said finish position and to stop when it reaches the start position.

4. A system as set forth in claim 1, wherein each item on said card is identified by a distinct symbol, and wherein said manually operated means includes a dial having like symbols thereon to cause said head to align with a track corresponding with a selected symbol.

5. A system as set forth in claim 1, wherein said card is printed on both faces, a tape for the items on each face being secured to the opposite face.

6. A system as set forth in claim 1, wherein said electronci means includes an amplifier whose input is coupled to said head, and an electromagnetic speaker coupled to the output of the amplifier.

7. A system as set forth in claim 6, wherein said card includes an additional track which is unrecorded, and further including recording means to record on said additional track by means of said head.

8. A system as set fourth in claim 7, wherein said recording means uses said speaker as a microphone which is coupled to the input of said amplifier.

9. A system as set forth in claim 1, wherein each item is a printed ford, and the related track carries the sound of said word.

References Cited

UNITED STATES PATENTS

| | | | |
|---|---|---|---|
| 2,849,542 | 8/1958 | MacChesney | 35—35.3 XR |
| 3,020,360 | 2/1962 | Gratian et al. | 35—35.3 XR |
| 3,307,274 | 3/1967 | Glaser | 35—35.3 |
| 3,348,320 | 10/1967 | Brokaw | 35—35.3 |

EUGENE R. CAPOZIO, *Primary Examiner.*

WILLIAM H. GRIEB, *Assistant Examiner.*